United States Patent
Hernandez, Jr.

[11] 3,723,963
[45] Mar. 27, 1973

[54] AIRCRAFT GYROHORIZON INDICATOR WITH SIGNAL LAMP POSITIONAL ATTITUDE INDICATING MEANS

[75] Inventor: Ralph Hernandez, Jr., Miami, Fla.

[73] Assignee: Aircraft Instruments, Inc., Miami Beach, Fla.

[22] Filed: Apr. 3, 1969

[21] Appl. No.: 813,252

[52] U.S. Cl. ................340/27, 33/204 C, 74/5.22
[51] Int. Cl. .................................................G08g 5/00
[58] Field of Search .33/204.2, 226; 340/27 AT, 282; 74/5.22, 5.6, 5.41, 5.4; 244/79; 335/151; 200/61.45, 61.52, 61.46; 343/108, 112

[56] References Cited

UNITED STATES PATENTS

| | | | |
|---|---|---|---|
| 1,856,436 | 5/1932 | Schueller | 33/204 |
| 2,663,008 | 12/1953 | McEwan | 33/204 |
| 2,883,863 | 4/1959 | Karsten | 74/5.22 |
| 3,307,413 | 3/1967 | DeBoer et al. | 74/5.6 |
| 3,339,864 | 9/1967 | Whitsen | 244/1 |
| 1,456,744 | 5/1923 | Tanner | 74/5.4 |
| 1,618,570 | 2/1927 | Chessin | 74/78 |
| 1,906,719 | 5/1933 | Richter | 74/5.41 |
| 2,482,504 | 9/1949 | Pennington | 340/27 |
| 2,304,061 | 12/1942 | Little | 335/151 |
| 2,745,091 | 5/1956 | Leffler | 340/27 |
| 2,911,618 | 11/1959 | Servanty | 340/282 |

FOREIGN PATENTS OR APPLICATIONS

| | | | |
|---|---|---|---|
| 1,134,273 | 11/1968 | Great Britain | |
| 737,236 | 9/1955 | Great Britain | 33/204 |

*Primary Examiner*—Ralph D. Blakeslee
*Attorney*—Ernest H. Schmidt

[57] ABSTRACT

A combination gyrohorizon instrument for aircraft which visually indicates in addition to the dial display presentation of the instrument, by means of signal lamps appropriately placed with respect to the instrument dial, departures from straight and level flight that exceed reasonable limits of pitch and bank. The signal lamps, indicating "nose up", "nose down", "left wing down" and "right wing down" are in circuits energized by a first switching means controlled by the relative rotational position of the inner and outer gimbals of the instrument for sensing departure beyond reasonable safety limits in one direction or the other in the pitch axis, i.e., either "nose up" or "nose down" flight, and a second switch means controlled by the relative rotational position of the outer gimbal and the instrument casing for sensing departure beyond reasonable limits in the roll axis, i.e., either "left wing down" or "right wing down" flight.

2 Claims, 10 Drawing Figures

Patented March 27, 1973

INVENTOR.
RALPH HERNANDEZ JR.
BY Ernest H Schmidt
ATTORNEY.

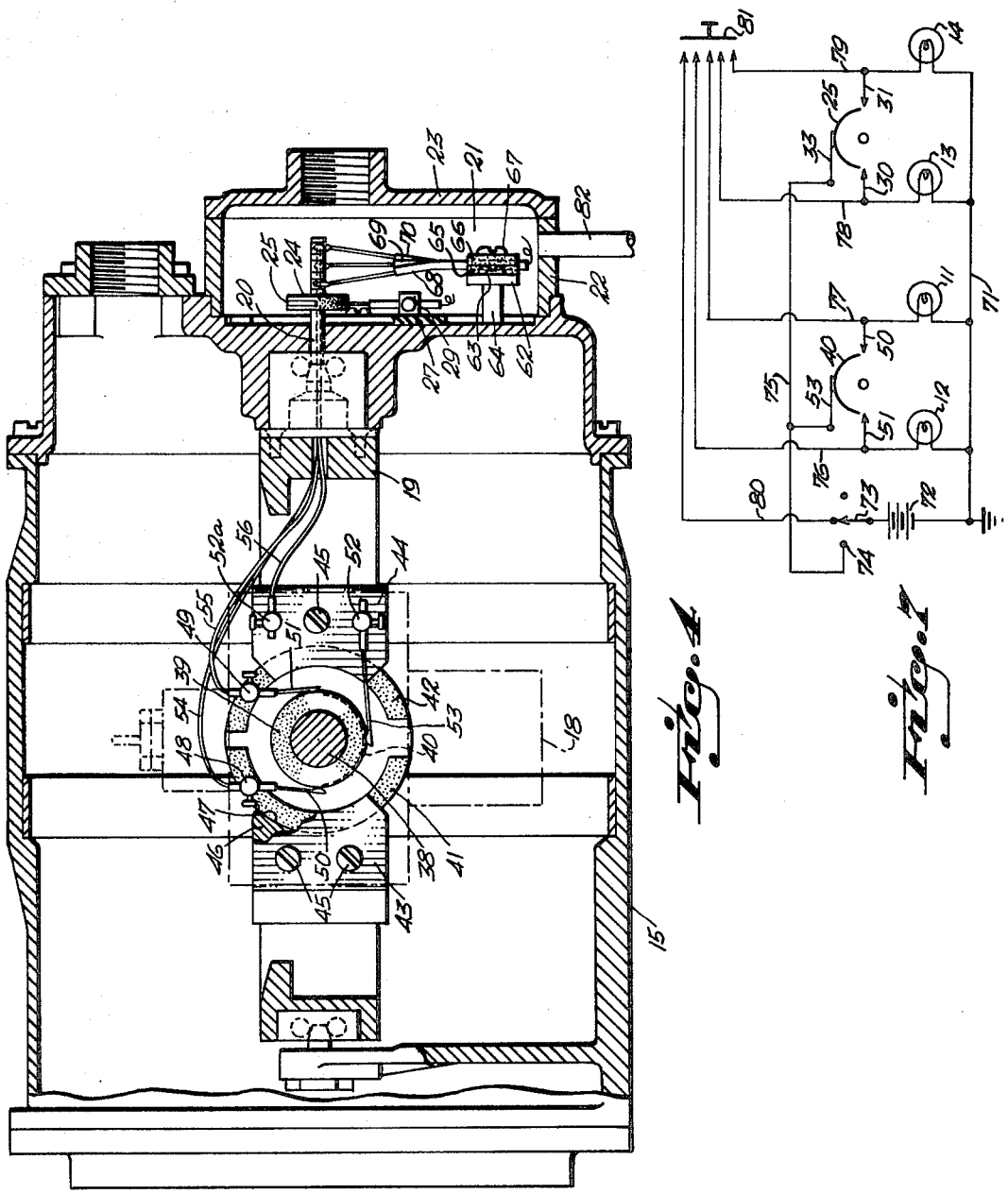

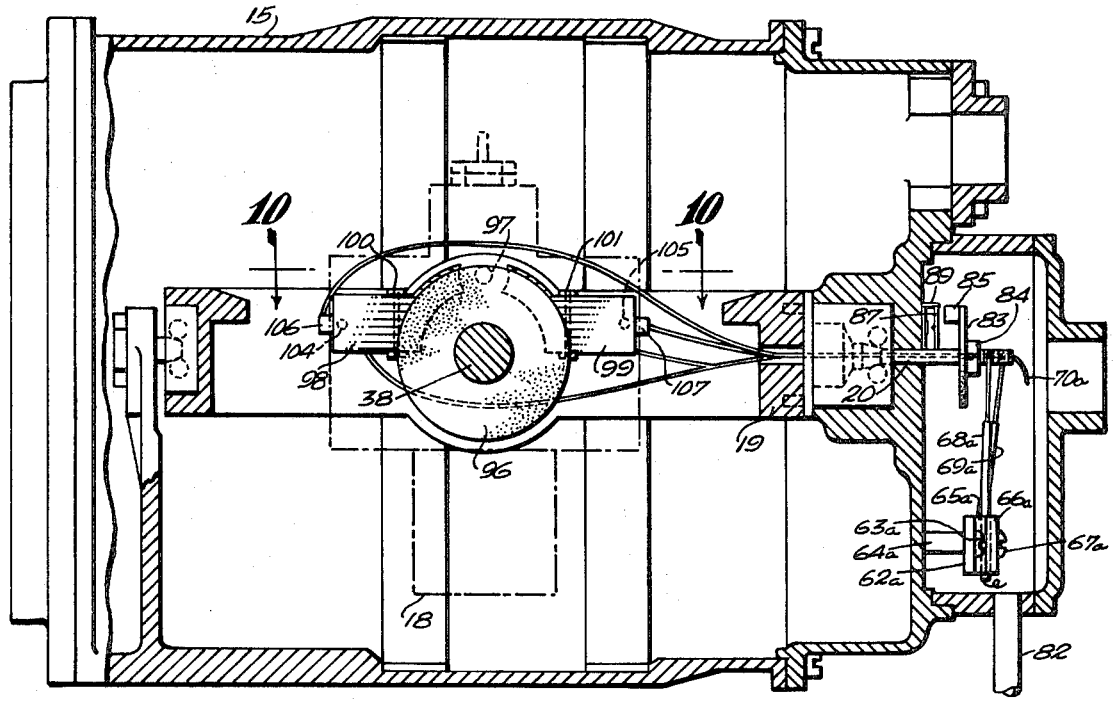
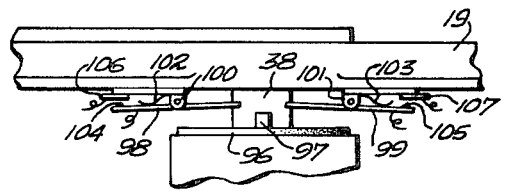
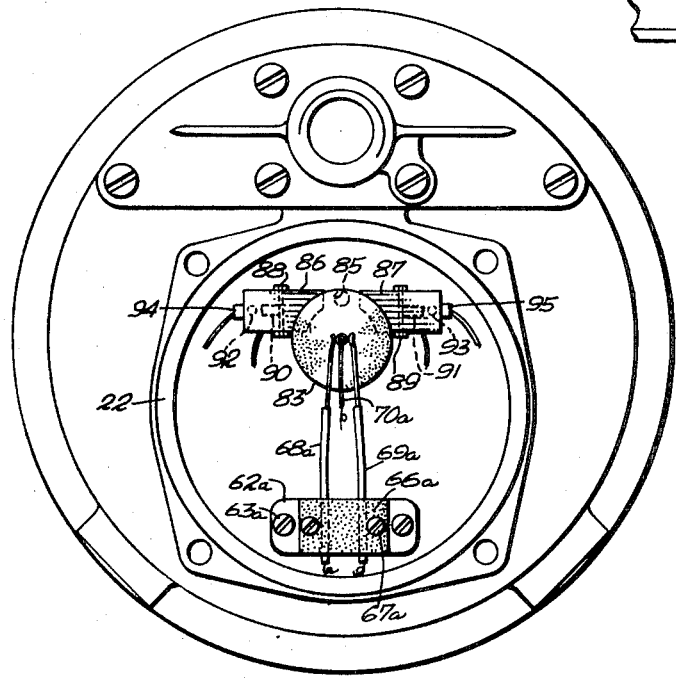

AIRCRAFT GYROHORIZON INDICATOR WITH SIGNAL LAMP POSITIONAL ATTITUDE INDICATING MEANS

This invention relates to flight control instruments and is directed particularly to improvements in gyrohorizon or artificial horizon instruments whereby the positional attitude of the aircraft when departing beyond predetermined acceptable limits from straight and level flight, in addition to being displayed in the usual manner on the instrument dial, is indicated by the selective energization of appropriately located signal lamps in the instrument panel. This invention is a continuation-in-part of applicant's patent application Ser. No. 704,844, Filed Feb. 12, 1968 now abandoned, wherein there is described a device utilizing pendulum-actuated switches controlling the energization of "nose up", "nose down", "left wing down" and "right wing down" signal lamp warning of corresponding departures of the aircraft from straight and level flight.

Presently, aircraft are equipped with various flight positional control instruments, the simplest of which are the basic turn and bank indicator and the artificial horizon instrument, readings of which are used by the pilot as an aid in determining aircraft attitude and control needed to set up and recover from a maneuver. While such instruments can be inspected casually from time to time under flight conditions, it is well known that blind flying without the use of such instruments will invariably lead to disaster because of the inability of the senses to properly interpret the sensations of flight without visual contact with the ground or horizon. Since in blind flying situations the inexperienced pilot, especially, will find it difficult to reconcile his physical feelings of aircraft attitude and motion with actual conditions as shown by the instruments, close observation and reliance on the instruments is required for him to achieve and maintain normal and controlled flight. Ordinarily, since the pilot flying into instrument or blind flying weather conditions will already be in an anxious state of mind, the difficulty of maintaining such close concentration while at the same time making proper corrective control to achieve the controlled flight, is too often beyond the capability of the inexperienced pilot, whereupon complete loss of control can occur within a matter of minutes.

It is, accordingly, the principal object of this invention to provide, in combination with a gyrohorizon instrument, a simple and effective flight control co-ordination signal means, in addition to the dial presentation of the instrument itself, in the form of a group of signal lamps indicating "nose up", "nose down", "right wing up" and "right wing down", aircraft position for signaling positional attitude and changes in positional attitude under instrument flight conditions. The signal lamps are so placed in the instrument panel with respect to their associated gyrohorizon instrument that they can be observed and understood without the necessity of the pilot looking directly at them, whereby his attention can be directed to other instruments or apparatus needed to achieve and maintain normal flight under instrument conditions. Since the signal lamps operate instantly, immediate corrective control can be effective by the pilot without critical observation of the instruments. Overcontrol will be reflected immediately by operation of the indicator lamps, so that proper control can readily be achieved without close concentration on the instruments.

A more particular object is to provide a combination gyrohorizon instrument of the character described wherein the signal lamp switching is effected by the provision of a first slip ring switch means controlled by the relative rotational position of the inner gimbal and the outer gimbal for sensing departure beyond reasonable limits in the pitch axis, and a second slip ring means controlled by the relative rotational position of the outer gimbal and the instrument casing for sensing departure beyond reasonable limits in the roll axis.

Yet another object is to provide a combination gyrohorizon instrument of the above nature wherein, instead of using slip rings magnetically-actuated rocker switches are utilized, thereby substantially eliminating frictional drag between the gimbals and between the outer gimbal and the casing, while at the same time minimizing wear and improving reliability and durability.

Yet another object of the invention is to provide a flight control indicator of the character described which will not present a warning indication under normal flight conditions, but will indicate abnormal or dangerous maneuvers.

Other objects, features and advantages of the invention will be apparent from the following description when read with reference to the accompanying drawings.

Referring now in detail to the drawings, wherein like reference numerals denote corresponding parts throughout the several views:

FIG. 4 is a vertical cross-sectional view of the modified gyrohorizon indicator, taken along the line 4—4 of FIG. 1 in the direction of the arrows and on an enlarged scale;

FIG. 7 is an electric schematic diagram of the device;

FIG. 8 is a vertical cross-sectional view similar to that of FIG. 4, but illustrating a modified form of the invention;

FIG. 9 is a rear end view, on an enlarged scale, of the modified form of the gyrohorizon indicator shown in FIG. 8, with the end cover removed to show the magnetic switch and slip ring mechanism; and FIG. 10 is a plan view, taken along the plane indicated by the line 10—10 in FIG. 8, illustrating details of the magnetic switching mechanism operating between the inner and outer gimbals.

Figure 1:
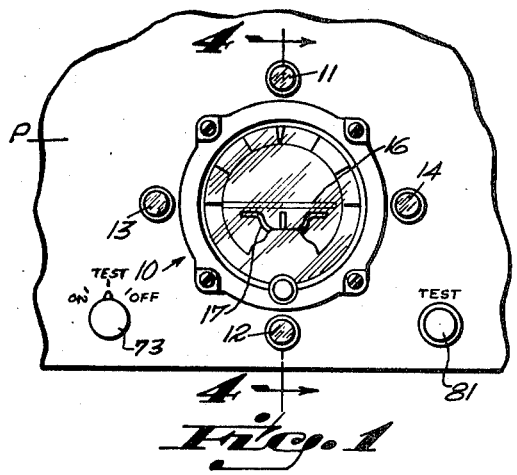
FIG. 1 is a partial view of an aircraft instrument panel illustrating a gyrohorizon indicator modified in accordance with the invention, and shown in association with horizontal and vertical warning signal lights.

In brief, my invention provides, in combination with and as an adjunct to the usual attitude gyro instrument 10 in an aircraft instrument panel P, visual indication of departure from reasonable limits in aircraft attitude with respect to both pitch and roll. Preferably, as illustrated in FIG. 1, "nose up" and "nose down" signal lamps 11 and 12, representative of deviations from pitch axis attitude will be located centrally above and below, respectively, the gyrohorizon indicator instrument 10, and the "left wing down" and "right wing down" signal lamps 13, 14, representative of deviations from roll axis attitude, will be mounted to the left and to the right, respectively, of said instrument, whereat said signal lamps will be best adapted to alert the pilot that corrective measures should be taken to maintain level flight.

Figure 2:
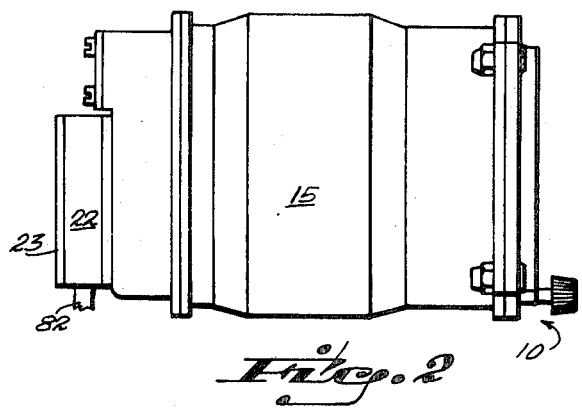
FIG. 2 illustrates, in side elevation and shown separately, a typical gyrohorizon indicator or artificial horizon instrument embodying the present invention.

Since the construction and operation of artificial horizon gyros of the type herein modified in carrying out the present invention is well known, only so much of the construction of the instrument as is deemed necessary is illustrated and described herein. Thus, as illustrated in FIGS. 1 and 2, the artificial horizon gyro or gyrohorizon indicator instrument 10 comprises an instrument casing 15 in the face of which a horizon bar 16 controlled by the gyro mechanism represents the horizon, and a small figure 17, representative of the airplane, in the center of the dial represents the aircraft. The position of the airplane symbol relative to the horizon bar indicates the actual position of the aircraft with respect to the natural horizon. Referring to FIG. 4, the gyro mechanism, by means of which the horizon bar 16 is indicative of the natural horizon, comprises an inner gimbal 18, within which the gyro rotor is contained with its spin axis maintained in a horizontal position, and an outer gimbal 19 journalled for axial rotation within the instrument casing 15 and having a rear outer gimbal spindle shaft 20 extending through a rear end portion of said casing and into an airflow chamber 21. The airflow chamber 21 in the modification of the instrument in accordance with the present invention is somewhat extended in axial length by the provision of a cylindrical spacer sleeve 22 between the rear end of the instrument casing 15 and the usual airflow chamber end plate 23, to provide space for added slip ring and brush mechanism as is hereinafter described.

Figure 3:
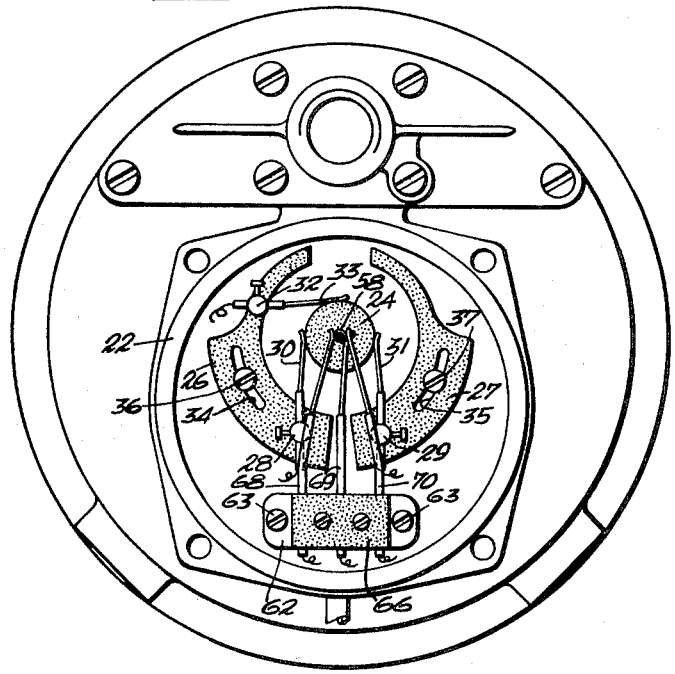
FIG. 3 is a rear end view, on an enlarged scale, of the gyrohorizon indicator shown in FIG. 1, with the end cover removed to show the slip ring and brush mechanism.
Figure 6:
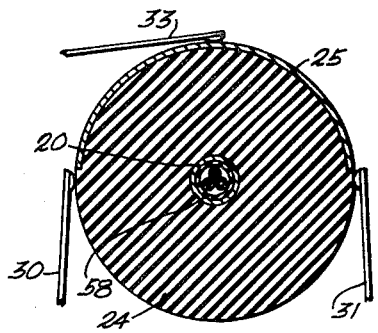
FIG. 6 is a horizontal cross-sectional view taken along the line 6—6 of FIG. 5 in the direction of the arrows.

Referring now to FIGS. 3 through 6 in the drawings, it will be seen that the outer gimbal spindle shaft 20 is fitted with a non-conductive, cylindrical slip ring disc 24, said slip ring disc being formed with a reduced-diameter flange portion 24a fitted with a radially-extending set screw 24b by means of which said disc is adjustably secured in place. The slip ring disc 24 has imbedded in its outer periphery a semi-circular, arcuate conductor element 25, slightly less than 180 circular degrees in extent. Brush means is provided for closing the electrical energizing circuit including the "left wing down" signal lamp 13 and the "right wing down" signal lamp 14 under corresponding conditions as sensed by the gyrohorizon indicator instrument 10. To this end, as is best illustrated in FIG. 3, a pair of laterally-opposed, electrically non-conductive brush support plates 26, 27, carrying conductive brush support posts 28, 29, respectively, are provided, said brush support posts being fitted with spring wire brushes 30, 31, respectively, which as illustrated in FIG. 6, resiliently contact the outer periphery of the slip ring disc 24 at positions just beyond the outer ends of the associated arcuate conductor element 25 when the aircraft is in level flight, irrespective of "nose up" or "nose down" attitude of the aircraft, as sensed by the gyrohorizon indicator instrument 10. The brush support plate 26 also carries a brush support post 32 fitted with a spring wire brush member 33, normally contacting the arcuate conductor element 25 at a central position therealong. As means for adjusting the distance between the outer ends of the arcuate conductor element 25 and the contact points of the spring wire brushes 30, 31 under level flight conditions, the brush support plates 26, 27 are provided with arcuate slots 34, 35, respectively, by means of which said support plates can be adjustably secured against the outer end of the instrument casing by the use of respective machine screws 36 and 37.

Means is also provided for closing the electrical energizing circuits including the "nose up" signal lamp 11 and the "nose down" signal lamp 12 under corresponding aircraft attitude positions exceeding predetermined limits of deviation in the pitch axis as sensed by the modified gyrohorizon indicator instrument 10. To this end, as illustrated in FIG. 4, the inner gimbal journal shaft 38 at one side of the inner gimbal 18 is fitted with a relative fixed, non-conductive cylindrical slip ring disc 39 imbedded in the outer periphery of which is a semi-circular arcuate conductor element 40 of somewhat less than 180 circular degrees in extent. A pair of laterally opposed, arcuate, non-conductive support members 41, 42 are provided in concentric relation with respect to the slip ring disc 39 and adjustably secured in place by means of clamp plates 43, 44 against an inner wall portion of the outer gimbal 19, said clamp plates being secured by machine screws 45. Spacers 46 between the clamp plates 43, 44 provide concentric arcuate inner edges 47 for locating the outer peripheries of said support members in their circular adjustment upon being clamped in place. The arcuate support members 41, 42 carry conductive support posts 48, 49, respectively, which, in turn, support spring wire contact brushes 50, 51, respectively, the outer ends of which are slightly spaced from the outer ends of the arcuate conductor element 40 when the aircraft is in level attitude in the pitch axis irrespective of roll or "left-wing down" or "right-wing down" attitude of the aircraft as sensed by the hyrohorizon indicator instrument 10.

Figure 5:
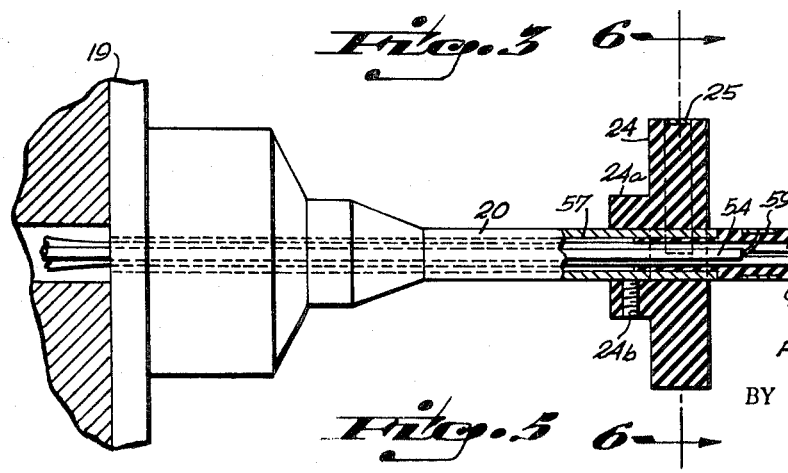
FIG. 5 is a fragmentary view, on an enlarged scale and with portions broken away, of the rear end spindle portion of the outer gimbal, illustrating constructional details of the slip ring assembly.

The clamp plate 44 carries a first support post 52 having secured thereto a common wire brush member 53 in contact with the arcuate conductor element 40 at a central position therealong. The clamp plate 44 also carries a second support post 52a, in electrical circuit with the brush 53 through said metal clamp plate 44. Conductors 54, 55 and 56 connected, respectively, to the support posts 48, 49 and 52a, extend through an axial opening 57 in the outer gimbal spindle shaft 20 (See FIG. 5) press-fitted in the outer end of which is a non-conductive tubular sleeve 58. Axially-spaced along the non-conductive sleeve 58 are circular slip rings 59, 60 and 61 which are electrically connected, from the inside, with conductors 54, 55 and 56, respectively. Brush means is provided for making electrical contact with the slip rings 59, 60 and 61. To this end, as is best illustrated in FIGS. 4 and 5, there is provided a metal support plate 62 secured in spaced relation against the outer end of the instrument casing by means of machine screws 63 extending through said support plate and spacer sleeves 64. Inner and outer non-conductive clamp members 65, 66, respectively, secured in place against the outside of the support plate 62 by means of machine screws 67, fix therebetween the inner ends of wire brush members 68, 69 and 70, the outer ends of which are in sliding contact with the slip rings 59, 60 and 61, respectively.

Referring now to FIG. 7 and considering the electrical wiring of the device, the same comprises a ground circuit including a common ground conductor 71 connected to one terminal of the aircraft battery 72. The positive or "hot" terminal of the battery 72 connects to the rotary switch arm of a three-position switch 73. In the position of the switch 73 illustrated in FIG. 7, being the test position, contact is made with conductor 80, leading to a push-button test switch for testing the signal lamps 11, 12, 13 and 14, simultaneously, as is hereinafter described. With the rotary switch 73 moved to the left or "on" position as illustrated in FIGS. 1 and 7, contact is made through the battery 72 with the conductor 75 which, in turn, is connected with the common spring wire brushes 33 and 53. The remaining energization terminals of the signal lamps 11, 12 connect through respective conductors 76, 77 to wire contact brushes 50, 51, and extend to terminate at the push button test switch 81. The remaining energization terminals of the signal lamps 13, 14 connect through conductors 78 and 79, respectively, to the spring wire contact brushes 30 and 31, and extend further to terminate at the push button test switch 81. In operation the rotary switch will first be turned from the "off" position, being the position to the left as represented in FIGS. 1 and 7, to the central or test position. The push button test switch will then be actuated to simultaneously energize the signal lamps 11, 12, 13 and 4 through "hot" conductor 80. After the operability of the signal lamps has thus been determined, the switch arm 73 will be turned to the left to render the arcuate conductor elements 25 and 40 "hot" whereupon they will serve to energize one or the other of their pair of associated signal lamps upon departure from straight and level flight in either the pitch or the roll axis, as has been hereinabove described. As indicated in FIGS. 1 and 4, the internal circuitry of the instrument connects with the external circuit components through a flexible cable 82 which extends through an opening in the cylindrical spacer sleeve 22 of said instrument.

Referring now to FIGS. 8 through 10, wherein there is illustrated a modified form of the invention utilizing magnetic switches operating between the inner and outer gimbals, it will be seen that the outer gimbal spindle shaft 20 is fitted with a non-conductive, non-magnetic circular disc 83 having a reduced diameter flange portion 84 provided with a set screw (not illustrated) for adjustable securement. The disc 83 has affixed thereto, at the inside and near the outer periphery thereof, a small circular permanent magnet 85 which will normally be positioned centrally and in spaced relation between a pair of opposed ferromagnetic, elongated switch rocker members 86, 87, said switch rocker members being rockably supported with respect to the rear wall portion of the casing 15 by pivot pins 88, 89. Leaf springs 90, 91 associated with the respective rocker members 86, 87 normally resiliently urge said rocker members so that their opposed inner ends are in down position, whereat their respective movable switch contacts 92, 93 will be in open-circuit position with respect to their associated fixed contacts 94, 95. It will thus be understood that when the small magnet 85 is in its central position representative of level flight, the associated switches will remain open circuited, regardless of "nose-up" or "nose-down" attitude of the aircraft as sensed by the gyrohorizon instrument 10. When the magnet moves sufficiently to one side or the other it will attract the corresponding rocker switch member 86 or 87 to close its associated switch as described above, which switch, it will be understood, will be in circuit with the corresponding signal lamp 13 or 14 to appropriately signal deviation from normal flight in the roll axis.

Referring to FIG. 10 of the modified form on the invention, it will be seen that magnetically operated switches are also provided for closing the electrical energizing circuits including the "nose-up" signal lamp 11 and the "nose-down" signal lamp 12 under corresponding aircraft attitude positions as sensed by the gyrohorizon indicator instrument 10. To this end, the inner gimbal journal shaft 38 at one side of the inner gimbal 18 is fitted with a circular, non-magnetic disc 96 having affixed thereto, at the outside and near its outer periphery, a small, circular permanent magnet 97, which will normally be positioned centrally and in spaced relation between a pair of opposed ferromagnetic, elongated switch rocker members 98, 99, said switch rocker members being rockably supported with respect to an inner wall portion of the outer gimbal 19 by pivot pins 100, 101. Leaf springs 102 and 103 associated with the respective rocker members 98, 99 normally resiliently urge said rocker members so that their opposed inner ends are in down position, whereat their respective movable switch contacts 104, 105 will be in open-circuit position with respect to their associated fixed contacts 106, 107. It will thus be understood that when the small magnet 97 is in its central position, the associated switches will remain open-circuited, regardless of "left-wing down" or "right-wing down" attitude of the aircraft as sensed by the gyrohorizon instrument 10. When the magnet 97 moves sufficiently to one side or the other, it will attract the corresponding rocker switch member 98 or 99 to close its associated switch as described above, which switch, it will be understood, will be in circuit with the corresponding signal lamp 13 or 14 to appropriately signal deviation from normal flight in the pitch axis. In the above described embodiment of the invention illustrated in FIGS 8 through 10, it will be understood that the pairs of rocker member contacts 92, 93, 104 and 105 will be connected in common, as in parallel with the "hot" conductor 75 illustrated in FIG. 7, in lieu of the arcuate conductor elements 25 and 40 of the first embodiment of the invention, and that the electrical circuitry will otherwise be the same as is illustrated in FIG. 7.

What I claim as new and desire to secure by Letters Patent is:

1. A device for signalling departure beyond predetermined limits from straight and level flight as indicated by a gyrohorizon instrument having a casing, an outer gimbal pivotally journalled within the casing, being determinative of deviation of an aircraft in the roll axis, and an inner gimbal, pivotally journalled within the outer gimbal about an axis perpendicular to the journal axis of the outer gimbal, the relative rotational position thereof, with respect to the outer gimbal, being determinative of deviation of an aircraft in the pitch axis; the combination comprising, a first pair of signal lamps indicating, when energized, "nose up" and "nose down" aircraft positional attitude, respectively, in the pitch axis, a second pair of signal lamps for indicating, when energized, "left wing down" and "right wing down" aircraft positional attitude, respectively, in the roll axis, a first means controlled by the relative position of said inner gimbal with respect to said outer gimbal for selectively energizing one or the other of said first signal lamps in accordance with corresponding "nose up" and "nose down" aircraft positional attitude, and a second means controlled by the relative position of said outer gimbal with respect to said casing for selectively energizing one or the other of said second pair of signal lamps in accordance with corresponding "left wing down" and "right wing down" aircraft positional attitude, said first pair of signal lamps being mounted directly above and below the indicating dial of the gyrohorizon instrument in an aircraft panel, and said second pair of signal lamps being mounted directly at each side of said instrument dial, thereby serving as a warning that the aircraft has departed from safe flight parameters, and thereby also serving to indicate the direction of aircraft deviation and whether such deviation is in pitch or in roll or both in pitch and roll.

2. A device for signalling departure beyond predetermined limits from straight and level flight as defined in claim 1 wherein said first energizing means comprises a first energizing circuit for each of said first pair of signal lamps, normally open-circuit first switch means in each of said first energizing circuits, means controlled by the relative movement of said inner gimbal with respect to said outer gimbal in one direction or the other to selectively actuate said first switch means, second energizing circuits for each of said second pair of signal lamps, normally open-circuit second switch means in each of said second energizing circuits, and means controlled by the relative movement of said outer gimbal with respect to said casing in one direction or the other to selectively actuate said second switch means.

* * * * *